3,121,692
ANTIFREEZE COMPOSITIONS
Edward L. Morehouse, Snyder, and Eugene A. Zientek, Kenmore, N.Y., assignors to Union Carbide Corporation, a corporation of New York
No Drawing. Filed Dec. 2, 1958, Ser. No. 777,562
12 Claims. (Cl. 252—75)

This invention relates to antifreeze compositions for use in the cooling systems of internal combustion engines.

Antifreeze compositions containing alcohols, especially ethylene glycol, are commonly mixed with the cooling water in the cooling systems of internal combustion engines in order to depress the freezing point of the water. The alcohols gradually decompose in the cooling systems to produce acidic products which lower the pH of the coolant. It has been found that in cooling systems the metallic surfaces in contact with such coolants become seriously corroded and that the corrosion becomes progressively worse as the pH of the coolant decreases. The decomposition of the alcohol, the lowering of the pH of the coolant and the attendant corrosion of the metallic surface of the cooling system result in both a significant loss of alcohol through decomposition and leakage in the cooling system.

Hence considerable effort has been directed toward obtaining antifreeze compositions that contain materials (inhibitors) which retard the corrosion of the cooling systems of internal combustion engines. It was also recognized that such inhibited antifreeze compositions should be most desirably single phase systems, since antifreeze compositions containing two or more phases entail handling and dispensing problems in order to insure that the compositions as they reach the consumer contain the proper proportion of each phase.

Numerous antifreeze compositions containing alcohols and inhibitors have been proposed to date. Such inhibitors include both organic materials and inorganic materials. Illustrative of the organic materials that have been used as inhibitors in antifreeze compositions are: guanidine, citrates, coal tar derivatives, petroleum bases, thiocyanates, peptones, phenols, thioureas, tannin, quinoline, morpholine, triethanolamine, tartrates, glycol mono-ricinoleate, organic nitrites, mercaptans, organic oils, sulfonated hydrocarbons, fatty oils and soaps. Illustrative of the inorganic materials that have been used as inhibitors are: sulfates, sulfides, fluorides, hydrogen peroxide; the alkali metal chromates, nitrites, phosphates, borates, tungstates, molybdates, carbonates and silicates and alkali earth metal borates.

The various inhibited antifreeze compositions proposed to date suffer from one or more disadvantages that limit their usefulness. Some are two phase compositions and so present handling and dispensing problems. Others do not adequately retard corrosion of any of the metals used in the cooling systems. Some inhibit the corrosion of some metals but are not particularly useful in inhibiting the corrosion of the other metals (e.g. antifreeze compositions containing organic oils as inhibitors protect iron but are not well suited for protecting aluminum and antifreeze compositions containing organic amines as inhibitors protect iron but promote the corrosion of copper). Still other disadvantages of known inhibited antifreeze compositions are poor shelf life (e.g. tendency to gel and/or form precipitates on standing), tendency to attack rubber hoses that are part of the cooling system, excessive foaming, tendency of the alcohols to decompose to produce acidic products and tendency to lose their corrosion inhibiting properties when employed outside a narrow temperature range and when in use for prolonged periods.

It is an object of this invention to provide improved single phase antifreeze compositions for use in the cooling systems of internal combustion engines that retard the corrosion of all of the metals that are suitable for use in such cooling systems.

Other objects of this invention are to provide improved antifreeze compositions for use in the cooling systems of internal combustion engines that have good shelf-life, that do not attack the rubber parts of the cooling system, that do not decompose appreciably to produce acidic products that accelerate corrosion, that do not foam excessively, and/or that are useful over a wide temperature range and after prolonged periods of service as coolants.

The compositions of this invention are single phase, inhibited compositions comprising an alcohol and, as an inhibitor, an organosilicon compound containing an amino group linked to a silicon atom by a divalent hydrocarbon group containing at least three carbon atoms wherein the amino group is attached to at least the third carbon removed from the silicon atom. Preferably the compositions of this invention contain water and/or an inorganic basic buffer in addition to an alcohol and an organosilicon inhibitor.

The alcohols that are useful in this invention include both monohydric alcohols (such as methanol, ethanol and propanol) and polyhydric alcohols (such as ethylene glycol, diethylene glycol, triethylene glycol, propylene glycol and glycerol). Mixtures of alcohols are also useful in the compositions of this invention. In view of its desirable physical properties (such as its low molecular weight and its low volatility) ethylene glycol is an especially useful alcohol in these compositions.

The organosilicon inhibitors that are used in this invention are compounds, including both hydrocarbonoxysilanes (including alkoxysilanes and aroxysilanes) and siloxanes (including homopolymeric and copoymeric siloxanes), containing an amino group that is linked to a silicon atom through a divalent hydrocarbon group containing at least three carbon atoms wherein the amino group is attached to at least the third carbon removed from the silicon atom. As used herein "hydrocarbonoxy" denotes a monovalent group composed of a monovalent hydrocarbon group linked to an oxygen atom (e.g. a —$OR^7$ group where $R^7$ is a monovalent hydrocarbon group). These organosilicon inhibitors can be primary, secondary or tertiary amines, but they are preferably primary amines. These organosilicon inhibitors contain the group that is represented by the formula:

$$Z_2NRSi\equiv \qquad (1)$$

wherein R is a divalent hydrocarbon containing at least three carbon atoms; the $Z_2N-$ group is attached to at least the third carbon atom removed from the silicon atom; Z is a hydrogen atom, an unsubstituted or a substituted monovalent hydrocarbon group, or a divalent group that is derived from an oxirane compound by the opening of the oxirane ring and that connects the nitrogen atom to the silicon atom by a carbon to carbon to oxygen linkage, and the free valances of silicon link the silicon atom to at least one alkoxy or aroxy group (i.e. when the inhibitor is a hydrocarbonoxysilane such as an alkoxysilane or an aroxysilane) or to at least one siloxy group (i.e. when the inhibitor is a siloxane). The substituents on the substituted monovalent hydrocarbon groups represented by Z can be hydroxyl, amino, amido, ester, hydrocarbonoxy or cyano groups. The free valences of the silicon atom in Formula 1 can link the silicon atom to from 0 to 2 monovalent hydrocarbon groups, divalent groups derived from oxirane compounds described above or $NH_2C_nH_{2n}$— groups where $n$ has a value of at least 3. As used herein an "oxirane compound" is a compound containing at least one oxirane ring structure i.e. a structure represented by the formula:

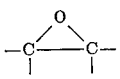

Typical of the groups represented by R in Formula 1 are: (a) groups containing an arylene group linked to an alkylene group (e.g. where Formula 1 represents the group: $Z_2NArC_aSi\equiv$ wherein $a$ has a value from 1 to 4 and Ar is an aryl group, preferably a phenyl group); (b) groups containing an alkylene group linked to an arylene group (e.g. where Formula 1 represents the group: $Z_2NCH_2C_6H_4Si\equiv$); (c) alkylene groups (e.g. where Formula 1 represents the group: $Z_2NC_nH_{2n}Si\equiv$ wherein $n$ has a value of at least 3 and preferably from 3 to 5) and (d) arylene groups (e.g. the meta- and para-phenylene groups).

Typical of the groups represented by Z in Formula 1 are: (a) the hydrogen atom; (b) monovalent hydrocarbon groups (e.g. aryl groups such as the phenyl group, alkyl groups such as the methyl, ethyl and propyl groups and aralkyl groups such as the beta-phenylethyl group); (c) substituted alkyl groups containing at least two carbon atoms (e.g. groups represented by the formulae $H_2NR^4$—, $HOR^4$—, $NCR^4$—, $H_2NCOR^4$— and $R^2OOCR^4$— wherein $R^4$ is an alkylene group containing at least two, and preferably from 2 to 10, carbon atoms such as the ethylene, 1,3-propylene and 1,4-butylene groups and $R^2$ is a monovalent hydrocarbon group such as defined for Z); (d) a divalent group that is derived from an oxirane compound by the opening of the oxirane ring which connects the nitrogen and the silicon atom in Formula 1 thru a carbon to carbon to oxygen linkage, that is composed of only carbon, hydrogen and oxygen and that is linked to the nitrogen atom of Formula 1 by a carbon to nitrogen bond and to the silicon atom of Formula 1 by an oxygen to silicon bond to provide a cyclic structure (i.e. a group denoted hereinafter as an —$OR^3$— group where $R^3$ is a divalent hydrocarbon or a divalent hydrocarbonoxy-hydrocarbon group), and (e) a hydroxyl-substituted monovalent group derived from an oxirane compound by the opening of the oxirane ring (denoted hereinafter as an $HOR^3$— group). The monovalent hydrocarbon groups represented by Z in Formula 1 preferably contain from 1 to 10 carbon atoms. In Formula 1, Z may be the same or different.

Silanes that are useful as inhibitors in this invention contain the group that is represented by Formula 1 and may be more specifically depicted by Formula 2.

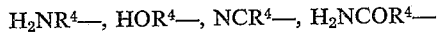

(2)

wherein $R^5$ is a monovalent hydrocarbon group or an $NH_2C_nH_{2n}$— group, X is an alkoxy group (such as a methoxy or ethoxy group) or an aroxy group (such as a phenoxy group), $b$ has a value of from 0 to 2, N, R and Z have the above defined meanings, $f$ has a value from 0 to 2 and represents the number of the above-defined divalent groups represented by Z, $(3-b-f)$ has a value from 1 to 3, and Z is preferably a hydrogen atom. Illustrative of the monovalent hydrocarbon groups represented by $R^5$ in Formula 2 are the alkyl groups (e.g. the methyl, ethyl, propyl and butyl groups), the aryl groups (e.g. the phenyl groups) and the aralkyl groups (e.g. the beta-phenylethyl group). The monovalent hydrocarbon groups represented by $R^5$ preferably contain from 1 to 10 carbon atoms.

Illustrative of the preferred silanes represented by Formula 2 (i.e. where both groups represented by Z are hydrogen atoms) are gamma-aminopropyltriethoxysilane, gamma-aminopropyltripropoxysilane, gamma-aminopropyl(methyl)diethoxysilane, gamma-aminopropyl(ethyl)diethoxysilane, gamma-aminopropyl(phenyl)diethoxysilane, delta-aminobutyltriethoxysilane, delta-aminobutyl(methyl)diethoxysilane, delta-aminobutyl(ethyl)diethoxysilane, delta-aminobutyl(phenyl)diethoxysilane and epsilon-aminopentyltriethoxysilane. Illustrative of the silanes represented by Formula 2 where at least one group represented by Z is a group derived from an epoxy compound (i.e. the above-defined —$OR^3$— and $HOR^3$— groups) are those silanes produced by reacting one mole of gamma-aminopropyltriethoxysilane and one or two moles of a hydrocarbon compound containing at least one oxirane ring (e.g. ethylene oxide, 1,2-propylene oxide, styrene oxide and dipentene dioxide) or a hydrocarbonoxy-hydrocarbon compound containing at least one oxirane ring (e.g. 1,2-epoxy-3-isopropoxy-propane and phenyl glycidyl ether). Illustrative of the silanes represented by Formula 2 wherein at least one group represented by Z is a monovalent hydrocarbon group are N-methyl-gamma-aminopropyltriethoxysilane, N,N-dimethyl-gamma-aminopropyltriethoxysilane, and N,N-dimethyl-delta-aminobutyl(methyl)diethoxysilane. Illustrative of the silanes represented by Formula 2 where Z is an alkyl group containing an amino substituent (i.e. the above-defined $NH_2R$— group) are N-gamma-aminopropyl-delta-aminobutyltriethoxysilane and N-beta-aminoethyl-gamma-aminopropyltrimethoxysilane. Illustrative of the silanes represented by Formula 2 where one group represented by Z is an alkyl group containing a hydroxyl substituent, (i.e. the above-identified $HOR^4$— group) are N-beta-hydroxyethyl-gamma-aminopropyltriethoxysilane, N-beta-hydroxyethyl-delta-aminobutyl(methyl)diethoxysilane. Illustrative of the silanes represented by Formula 2 where Z represents an alkyl group containing an ester substituent group (i.e. the above-defined $R^2OOCR^4$— group) are N-beta-carbethoxyethyl-gamma-aminopropyltriethoxysilane, N-beta-carbethoxyethyl-delta-aminobutyl(methyl)diethoxysilane and N,N-dicarbethoxyethyl-gamma-aminopropyltriethoxysilane. Illustrative of the silanes represented by Formula 2 where R is an arylene group are p-aminophenyltriethoxysilane and m-aminophenyltriethoxysilane. Illustrative of silanes represented by Formula 2 wherein R is an arylene group linked to an alkylene group are beta-(p-aminophenyl)ethyltriethoxysilane, p-aminophenylmethyltriethoxysilane, beta-p-aminophenylethyl(methyl)diethoxysilane, beta-(aminophenyl)-ethyldimethylethoxysilane, beta-(aminotolyl)-ethyltriethoxysilane and p-aminophenylmethyltriethoxysilane. Illustrative of silanes represented by Formula 2 wherein R is an alkylene group linked to an arylene group are meta- and para-aminomethylphenyltriethoxysilane. Illustrative of silanes represented by Formula 2 wherein $R^5$ is a $NH_2C_nH_{2n}$— group are bis-(gamma-aminopropyl)diethoxysilane, delta-amino-beta-methylbutyl epsilon-aminopentyldiethoxysilane [i.e. $H_2NCH_2CH_2CH(CH_3)CH_2Si(OC_2H_5)_2(CH_2)_5NH_2$] and bis(delta-aminobutyl)diethoxysilane.

The siloxanes useful as inhibitors in this invention contain the group that is represented by Formula 1 and may be more specifically described as containing one or more of the siloxane groups represented by Formula 3.

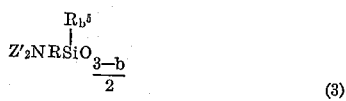

wherein R, $R^5$ and $b$ have the above-defined meanings and Z' has the meanings defined above for Z other than the —$OR^3$— group. In Formula 3, Z' is preferably a hydrogen atom. Illustrative of the preferred siloxane groups represented by Formula 3 (i.e. where both groups represented by Z' are hydrogen atoms) are the beta-(aminophenyl)ethylsiloxy, beta-(aminotolyl)propylsiloxy, gamma-aminopropylsiloxy, gamma-aminopropyl(methyl)siloxy, gamma-aminopropyldimethylsiloxy, delta-aminobutylsiloxy, delta-aminobutyl(methyl)siloxy, delta-aminobutyldimethylsiloxy, epsilonaminopentylsiloxy groups and the like. Illustrative of the siloxane groups represented by Formula 3, wherein at least one group represented by Z' is a group derived from an epoxy compound (i.e. the above defined $HOR^3$— group) are the siloxane group derived by reacting one mole of a siloxane containing one gamma-aminopropylsiloxy or delta-aminobutylsiloxy group and one or two moles of a hydrocarbon compound containing at least one oxirane ring (i.e. ethylene oxide, 1,2-propylene oxide, styrene oxide and dipentene dioxide) or a hydrocarbonoxy-hydrocarbon compound containing at least one oxirane ring (e.g. 1,2-epoxy-3-isopropoxy-propane and phenyl glycidyl ether). Illustrative of the siloxane groups represented by Formula 3 where at least one group represented by Z' is a monovalent hydrocarbon group are the N-methyl-gamma-aminopropylmethylsiloxy, N,N-dimethyl-delta-aminobutyl(methyl)siloxy, and N,N-dimethly-gamma-aminopropylsiloxy groups. Illustrative of the siloxane groups represented by Formula 3 where one of the groups represented by Z' is an amino-substituted alkyl group (i.e. the above-defined $H_2NR^4$— group) are the N-beta-aminoethyl-gamma-aminopropyl(methyl)siloxy, N-gamma-aminopropyl-delta-aminobutylsiloxy and N-beta-aminoethyl-delta-aminobutylmethylsiloxy groups. Illustrative of the siloxane groups represented by Formula 3 where one of the groups represented by Z' is a hydroxyl-substituted alkyl group (i.e. the above-defined $HOR^4$— group) are N-beta-hydroxyethyl-delta-aminobutyl(methyl)siloxy and N,N-di(beta-hydroxyethyl)-delta-aminobutyl(methyl)siloxy groups. Illustrative of the siloxane groups represented by Formula 3 where Z' represents a cyano-substituted alkyl group (i.e. the above-defined $NCR^4$— group) are N-beta-cyanoethyl-gamma-aminopropyl(methyl)siloxy, N-beta-cyanoethyl-delta-aminobutylsiloxy, and N-beta-cyanoethyl-delta-aminobutyl(methyl)siloxy groups. Illustrative of the siloxane groups represented by Formula 3 where Z' represents an alkyl group containing an ester substituent group (i.e. the above-defined $R^2OOCR^4$— group) are the N-beta-carbethoxyethyl-gamma-aminopropyl(methyl)siloxy, N,N-dicarbethoxyethyl-gamma-aminopropylsiloxy and N-beta-carbethoxyethyl-delta-aminobutyl(methyl)siloxy groups. Illustrative of siloxane groups represented by Formula 3 where R is an arylene group are the para-aminophenylsiloxy and meta-aminophenylsiloxy groups. Illustrative of siloxane groups represented by Formula 3 where R is an arylene group linked to an alkylene group are the beta-(p-aminophenyl)ethylsiloxy, beta-(p-aminophenyl)ethyl(methyl)siloxy, beta-(p-aminophenyl)ethyldimethylsiloxy, beta-(p-aminotolyl)ethylsiloxy and p-aminophenylmethyldimethylsiloxy groups. Illustrative of siloxane groups represented by Formula 3 where R is an alkylene group linked to an arylene group are the meta- and para-aminomethylphenylsiloxy groups. Illustrative of the siloxane groups represented by Formula 3 wherein $R^5$ is a $NH_2C_nH_{2n}$— group are the bis(gamma-aminopropyl)siloxy, the bis-(delta-aminobutyl)siloxy and the delta-aminobeta-methylbutyl epsilon-aminopentylsiloxy groups, i.e.

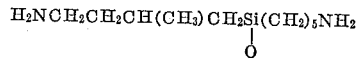

Silanes represented by Formula 2 and siloxanes containing siloxane groups represented by Formula 3 and processes for their production are disclosed in U.S. patent applications Serial Nos.: 615,480, filed October 12, 1956, and now abandoned; 655,506, filed April 29, 1957, and now abandoned; 615,463, filed October 12, 1956, and now abandoned; 727,527, filed April 10, 1958, and now abandoned and 668,621, filed June 28, 1957 now U.S. Patent No. 2,907,784, and 727,534, filed April 10, 1958, and now abandoned.

Organosilicon inhibitors containing the

group can be produced by reducing compounds containing the $NCC_6H_4Si\equiv$ group. By way of illustration, p-aminomethylphenyltriethoxysilane can be produced by forming a mixture of p-cyanophenyltriethoxysilane, dissolved in toluene, hydrogen and a catalytic amount of nickel supported on alumina and heating the mixture to a temperature of about 150° C. to cause the p-cyanophenyltriethoxysilane and the hydrogen to react to produce para-aminomethylphenyltriethoxysilane.

Organosilicon compounds containing a group represented by Formula 1 where one of the free valences of of the silicon atom is attached to a $H_2NC_nH_{2n}$— group can be produced by processes that include reducing the corresponding cyano compounds. Thus organosilicon compounds containing two aminoalkyl groups attached to the same silicon atom can be produced by known reducing processes employing, as starting materials, organosilicon compounds containing two cyanoalkyl groups attached to the same silicon atom. Suitable starting organosilicon compounds containing two cyanoalkyl groups attached to the same silicon atom and processes for their production are disclosed in United States patent applications Serial Nos. 555,203, filed December 23, 1955, and now abandoned, and 555,208, filed December 23, 1955, now U.S. Patent No. 2,908,700.

Siloxanes that are useful as inhibitors in this invention include homopolymeric compounds containing only one type of siloxane group represented by Formula 1 [or more specifically by Formula 3]. Useful siloxanes also include copolymeric compounds that contain (a) two or more types of siloxane groups represented by Formula 3; or (b) one or more of the latter-mentioned siloxane groups and also one or more siloxane groups represented by the formula:

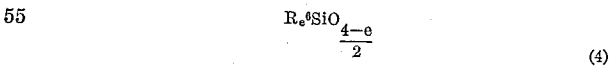

wherein $R^6$ is a monovalent hydrocarbon group and $e$ has a value from 1 to 3. Illustrative of the monovalent hydrocarbon groups represented by $R^6$ in Formula 4 are the alkyl groups (e.g. the methyl, ethyl, propyl and butyl group), the aryl groups (e.g. the phenyl group), the aralkyl groups (e.g. the phenyl-ethyl group), the alkenyl groups (e.g. the vinyl and the allyl groups), the cyclo alkenyl groups (e.g. the cyclohexenyl group) and the cycloalkyl groups (e.g. the cyclohexyl group). Preferably these monovalent hydrocarbon groups contain up to ten carbon atoms. Illustrative of the groups represented by Formula 4 are the methylsiloxy, dimethylsiloxy, trimethylsiloxy, ethyl(vinyl)siloxy, beta-phenylethylsiloxy, diphenylsiloxy, phenyl(ethyl)methylsiloxy and diethylsiloxy groups.

The siloxanes that are useful in this invention as inhibitors can have a linear, cyclic or crosslinked structure or combinations of these structures. The siloxanes can contain alkoxy or hydroxyl groups bonded to silicon of the siloxane and $SiO_2$ groups.

Illustrative of the siloxane homopolymers that are useful as inhibitors in this invention are gamma-aminopropyl(methyl)siloxane cyclic trimer and tetramer, delta-aminobutyl(methyl)siloxane cyclic trimer and tetramer, linear, hydroxy end-blocked, delta-aminobutyl(methyl)polysiloxanes, gamma-aminopropylpolysiloxanes, bis-(delta-aminobutyl)tetramethyldisiloxane and delta-aminobutylpolysiloxane.

Illustrative of the siloxane copolymers that are useful as inhibitors in this invention are bis(trimethylsiloxy)-gamma-aminopropyl(methyl)trisiloxane, copolymers containing dimethylsiloxy and gamma-aminopropyl(methyl)siloxy or delta-aminobutyl(methyl)siloxy groups, copolymers containing gamma-aminopropylsiloxy and phenylsiloxy, methylsiloxy or vinylsiloxy groups, copolymers containing delta-aminobutylsiloxy and phenylsiloxy groups or amylsiloxy groups, copolymers containing N,N-di(beta-hydroxyethyl)-delta-aminobutyl(methyl)siloxy and dimethylsiloxy groups.

These useful copolymeric inhibitors can be produced by the cohydrolysis and cocondensation of silanes represented by Formula 2 and silanes represented by the formula:

$$R_e^6 SiX_{4-e} \qquad (5)$$

wherein $R^6$ and $e$ have the meanings defined for Equation 4 and X has the meaning defined for Equation 2. Illustrative of silanes represented by Formula 5 are methyltriethoxysilane, dimethyldiethoxysilane, trimethylethoxysilane, phenyltriethoxysilane, ethyltriethoxysilane, vinyltriethoxysilane, amyltriethoxysilane, ethylvinyldiethoxysilane, diethyldiethoxysilane and diphenyldiethoxysilane.

Preferably the organosilicon inhibitors contain an amino group to silicon atom ratio of at least 1:25 and most desirably from 1:2 to 2:1. These organosilicon inhibitors, as contrasted with other organosilicon compounds, were found to be characterized by their greater solubility in alcohols, especially ethanol. The solubility of these inhibitors is at least about 1 part by weight per 100 parts by weight of ethanol but the most useful inhibitors are soluble to the extent of about 10 parts by weight per 100 parts by weight of ethanol.

The amount of the organosilicon inhibitor present in the compositions of this invention will vary widely from case to case depending upon the temperature, type of metal or metals of which the cooling system is composed, type of alcohol in the composition, pH of the cooling water, velocity of the cooling water through the cooling system during operation, solutes (e.g. electrolytes such as chlorides, sulfates and bicarbonates) or other materials in the cooling water and prior treatment or corrosion of the metal. In general, amounts of the organosilicon inhibitor of from .0001 part to 10 parts by weight per 100 parts by weight of the alcohol are useful but amounts of the organosilicon inhibitor from 0.01 part to 5.0 parts by weight per 100 parts by weight of the alcohol are preferred. The above ranges are given to indicate the generally useful and preferred amounts of the organosilicon inhibitor and may be departed from, though it is not usually desirable to do so since no advantage is gained thereby.

The compositions of this invention preferably contain basic buffers. These buffers serve to maintain also the pH above 7 and preferably from 8 to 12 in order to minimize corrosion which increases with decreasing pH. Salts derived from: (1) bases that are soluble in and appreciably ionized in water, and (2) acids that are soluble in and not appreciably ionized in water are useful as buffers in the compositions of this invention. These bases and acids are usually denoted as strong bases and weak acids respectively. Salts derived from weak acids and strong bases such as the hydroxides of the alkali metals (such as sodium, potassium and lithium) and the hydroxides of the alkali earth metals (such as magnesium and calcium) are especially useful although salts derived from weak acids and other bases (such as ammonium hydroxide) can also be employed. Salts derived from strong bases and acids such as boric, molybdic, phosphotungstic, phosphomolybdic, phosphoric, carbonic, silicic, tungstic, and arsenious acid are useful basic buffers. Such acids generally have $-\log K$ values (as given in the "Handbook of Chemistry," N. A. Lange, editor, pages 1229 to 1233, 8th edition, Handbook Publishers Inc., Sandusky, Ohio, 1952), of at least 1.8 and preferably at least 6.0. Illustrative of useful buffers are sodium and potassium carbonate, sodium phosphate, sodium molybdate, sodium phosphomolybdate, sodium phosphotungstate, sodium meta-arsenite, lithium molybdate, lithium borate, magnesium borate, ammonium monohydrogen phosphate, sodium tungstate and the like. Preferred buffers are sodium silicate, potassium silicate, and magnesium, sodium, potassium and calcium borate. Mixtures of these buffers are also useful in the compositions of this invention.

The amount of the basic buffer used in the compositions of this invention depends to some extent upon its solubility, the shelf life of the composition containing the buffer, effectiveness of the particular buffer and similar factors. Generally, amounts of these buffers from 0.1 part to 10 parts by weight, or preferably from 0.5 part to 3 parts by weight, per 100 parts by weight of the alcohol are used in the compositions of this invention. The use of lesser amounts of the buffer may result in a significant decrease in the pH of the coolant in a relatively short time whereas the use of greater amounts of the buffer may involve a needless cost and insolubility problems. No advantage is generally gained by departing from the indicated ranges.

The salts used as basic buffers in the compositions of this invention can be mixed as such with an alcohol and an organosilicon inhibitor in the formation of the compositions of this invention or, alternately, the corresponding bases and acids may be mixed and the salts formed in situ. By way of illustration, sodium silicate may be used as such or alternately, sodium hydroxide and silicic acid may be used and the sodium silicate formed in situ. As a further illustration calcium borate may be used as such or alternately, calcium hydroxide and boric acid may be used and the calcium borate formed in situ.

The compositions of this invention alone can be used alone as coolants in the cooling systems of internal combustion engines or they can be mixed with the cooling water used in the cooling systems. In either case, the compositions of this invention preferably contain water since water imparts desirable properties to the compositions, e.g. small amounts of water serve to lower the freezing point of the compositions and large amounts of water impart good heat transfer properties to the compositions. The compositions of this invention can contain from 0 part by weight to 900 parts by weight of water per 100 parts by weight of the alcohol. When the compositions themselves are to be used as the coolant, it is desirable that they contain from 30 parts to 900 parts by weight of water per 100 parts by weight of the alcohol. When the compositions of this invention are to be mixed with water prior to use as coolants in an internal combustion engine (commercial antifreeze compositions are usually sold in this form), it is desirable that they contain from 0 part to 50 parts by weight (or more desirably from 2 parts to 5 parts by weight) of water per 100 parts by weight of the alcohol. In the latter case, the amount of cooling water to which the composition is mixed should be such that the resulting solution contains from 30 parts to 900 parts by weight of water per 100 parts by weight of the alcohol. The relative amount of water and alcohol in these compositions can be varied to lower the freezing point of the water by the desired amount.

If desired, various additives can be added to the compositions of this invention in particular instances for imparting special properties. By way of illustration antifoam agents, identifying dyes, known inhibitors, sealants which prevent leakage of the coolant from the cooling system, anti-creep agents which prevent seepage of the coolant into the crankcase and the like can be added to the compositions of this invention.

The compositions of this invention can be formed in any convenient manner. Owing to the various solubility relationships among the components of the compositions of this invention it is often advisable, although not critical, to follow a particular sequence in mixing the components. By way of illustration, compositions of this invention containing an alkali metal silicate, ethylene glycol, water and an organosilicon inhibitor can be formed by first mixing an alkali metal hydroxide, water and silicic acid, then adding the ethylene glycol and finally adding the inhibitor. Following the above-described order of mixing the components of the compositions of this invention is not critical but minimizes the time required to obtain a single phase system.

The compositions of this invention inhibit the corrosion of all the metals that are suitable for use in the cooling systems of internal combustion engines. Such metals include magnesium and the metals below magnesium in the electromotive series (e.g. aluminum, iron, copper, chromium, nickel, lead, tin and zinc) as well as alloys of such metals (e.g. brass, bronze and steel). The compositions of this invention are particularly applicable to inhibiting corrosion of cooling systems composed of iron, brass, copper and/or aluminum.

The compositions of this invention are single phase compositions and hence they are free of the bulk handling and dispensing problems presented by two phase compositions. Generally these compositions have good shelf life, do not attack the rubber hoses which are a part of the cooling systems of internal combustion engines, do not decompose significantly during long periods of use, do not foam excessively and are useful over a wide temperature range. The compositions of this invention are particularly suited for use in the cooling systems of internal combustion engines. However, their utility is not limited to such systems since the compositions of this invention are generally useful in heat exchange apparatus where alcohol-containing coolants can be employed.

The improvements in corrosion inhibition resulting from the use of the compositions of this invention were found and evaluated by both elaborate laboratory tests designed to simulate field conditions and also carefully controlled tests in full scale automotive equipment. In the examples given below, both types of evaluation tests were employed.

200-HOUR CORROSION TEST

This is a laboratory test which has proven over many years to be useful in evaluating inhibitors for use in aqueous alcohol anti-freeze solutions such as are used in the cooling systems of internal combustion engines. The test involves immersing clean strips of metal (usually iron, aluminum, brass and copper) and a brass coupon on which is a spot of solder, composed of 50 wt. percent lead and 50 wt. percent tin, in the test fluid with heating and aeration for a period of 200 hours. After this exposure, the specimens are cleaned and corrosion of the metal strips is measured by weight loss in milligrams. The corrosion of the spot of solder on the brass coupon is given a rating (called solder spot rating, abbreviated SS in the examples) by visual inspection with a rating of 6 indicating little or no corrosion and a rating of 0 indicating very severe corrosion.

Each test unit consists of a 600 ml. glass beaker equipped with a reflux condenser and an aeration tube. The test specimens are cut from 1/16 inch sheet stock usually with a total surface area of about nine (9) square inches. Test temperature is 180° F. and the aeration rate is 0.028 cubic foot per minute. Specimens are separated with Z-shaped glass rods and are covered with 350 cc. of solution. Except where otherwise indicated, water used in preparing test solutions has 100 parts per million added of each of bicarbonate, chloride and sulfate ions. This gives an accelerated corrosion rate that simulates the corrosion rate that prevails when corrosive water is used in actual practice. Duplicate tests are run simultaneously and both values or the average values of weight loss, final pH and final RA (defined below) are given.

ENGINE TESTS

In each test a split cooling system is provided on a standard automobile engine, which allows the antifreeze composition being evaluated to be tested in parallel and simultaneously with a reference fluid or control. The power generated by the engine is absorbed by a dynamometer. Use of a split cooling system serves to minimize engine variables and provides a more valid appraisal than if two separate engines were employed. Metal specimens (usually 4.5 sq. in. surface area) are inserted into the cooling system, usually in the radiator hoses, and results are evaluated by measuring weight losses of the metal specimens after measured time periods of operation which are equivalent to certain mileage. Samples of the coolants are withdrawn periodically and their pH, glycol content and reserve alkalinity (as defined below) are determined.[1] The compositions tested are diluted with water till the volume ratio of alcohol to water is about 1:1. The engine is run at a rate equivalent to 60 m.p.h. on a level road.

In the pre-rusted engine test a solution of acetic acid dissolved in an aqueous ethylene glycol solution is added to the cooling system and the engine run for about 35 hours to cause rusting. Then the acetic acid solution is drained, the test and reference liquids are added and the engine test is run as described above. This test evaluates the performance of the test liquid under conditions of severe rusting.

The clean engine test is run as described above in an engine that has not been prerusted.

The engines used in the engine tests are equipped with cooling systems that are under atmospheric pressure. This allows for evaluation of the tendency of the test coolants to foam under conditions that are favorable to severe foaming.

The reserve alkalinity of an anti-freeze composition is a measure of the ability of the composition to resist a decrease in pH due to the presence of acidic materials. Reserve alkalinity (abbreviated RA in the examples) is determined by titrating a sample (about 10 cc.) of the composition with 0.1 N aqueous hydrochloric solution. From the number of milliliters of the acid actually required to neutralize the sample, the number that would be required to neutralize 100 milliliters of the composition if it contained a water to alcohol ratio of 3:1 on a volume basis is computed and this latter number is the reserve alkalinity of the composition.

In the following examples, BR is used as an abbreviation for brass. All of the compositions of this invention described in the examples below were single phase compositions. The following examples illustrate the present invention.

Several compositions or formulae were prepared and

---

[1] The amount of sample withdrawn is replaced by an equal volume of water.

tested in the following examples. These formulae contained the indicated components:

*Formula A.*—This is a composition of this invention. It is a single phase composition containing:

[A copolymer containing equal numbers of the groups]

| | Parts by wt. |
|---|---|
| $C_6H_5SiO_{1.5}$ and $NH_2C_3H_6SiO_{1.5}$ | 1.0 |
| Ethanol | 2.3 |
| $Ca(BO_2)_2$ [formed by mixing $Ca(OH)_2$ with an excess of $H_3BO_3$] | 1.0 |
| Ethylene glycol | 93.58 |
| Water | 1.0 |

*Formula B.*—This is a composition of this invention. It is a single phase composition containing:

[A copolymer containing equal numbers of the groups]

| | Parts by wt. |
|---|---|
| $NH_2C_4H_8SiO_{1.5}$ and $C_6H_5SiO_{1.5}$ | 1.0 |
| Ethanol | 2.3 |
| $Ca(BO_2)_2$ [formed by mixing $Ca(OH)_2$ with an excess of $H_3BO_3$] | 1.0 |
| Ethylene glycol | 93.58 |
| Water | 1.0 |

*Formula C.*—This is a composition of this invention. It is a single phase composition and is formed by mixing:

| | Parts by wt. |
|---|---|
| Ethylene glycol | 97.5 |
| $NH_2(CH_2)_4Si(OC_2H_5)_3$ | 0.5 |
| $Na_2SiO_3$ | 1.0 |
| $H_2O$ | 1.0 |

*Formula D.*—This is a reference mixture and it is a commercially available two-phase antifreeze composition that has achieved remarkable commercial success. It contains a water-ethylene glycol phase in which is dissolved an alkali earth borate and an organic oil phase.

*Formula E.*—This is a reference solution and it is a commercially available single-phase antifreeze composition. It contains water, an alkali metal borate and ethylene glycol.

*Formula F.*—This is a composition of this invention. It is a single phase composition and is formed by mixing:

| | Parts by wt. |
|---|---|
| $NH_2(CH_2)_4Si(OC_2H_5)_3$ | 0.4 |
| Sodium metasilicate | 0.27 |
| Ethylene glycol | 98.33 |
| Water | 1.0 |

*Formula G.*—This is a reference solution containing:

| | Parts by wt. |
|---|---|
| $Ca(BO_2)_2$ [formed by mixing $Ca(OH)_2$ with an excess of $H_3BO_3$] | 1.0 |
| Ethylene glycol | 95.88 |
| $H_2O$ | 2.00 |

Example I

The 200-hour corrosion test was run using three reference compositions which had been diluted with water to produce test liquids containing 100 parts by weight of ethylene glycol and 180 parts by weight of water. The results are shown on Table I.

TABLE I

| Reference | pH | | RA[1] | | Wt. Losses, mg./9 in.[2] | | | | S.S.[4] |
|---|---|---|---|---|---|---|---|---|---|
| | I[2] | F[3] | I | F | Fe | Al | BR | Cu | |
| Ethylene Glycol | 6.9 | 4.9 | 0 | acid | 1,739 | 40 | 196 | 186 | 4.5 |
| Formula G | 7.8 | 7.7 | 58 | 51 | 425 | 104 | 27 | 34 | 4.5 |
| Formula D | 7.8 | 7.7 | 56 | 50 | 15 | 15 | 11 | 20 | 6 |

[1] Reserve alkalinity.
[2] I denotes initial value.
[3] F denotes final value.
[4] Solder spot rating.

The results obtained with ethylene glycol alone and with Formula G show the need for corrosion inhibition in such systems. Formula D is a two-phase system and presents bulk handling and dispensing problems in commercial practice.

Example II

A pre-rusted engine test was run on Formula E which had been diluted with water to produce a test liquid containing 100 parts by volume of ethylene glycol and 100 parts by volume of water. Formula E is a commercially available single-phase antifreeze composition. The results obtained are shown in Table II.

TABLE II.—CORROSION

| Mileage | Wt. Losses (mg. per 4.5 sq. in.) | |
|---|---|---|
| | Al | S.S. |
| 5,000 | 169 | 6 |
| 10,000 | 351 | 5.5 |
| 15,000 | 477 | 5.5 |

These results when compared with the results of Example XII show the aluminum corrosion that occurs when the above compositions are used is greater than the corrosion that occurs when compositions of this invention are employed (e.g. Formula C). In addition, better iron and copper protection is afforded by compositions of this invention than by Formula E.

Example III

The 200-hour corrosion test was run on several solutions containing an inorganic buffer but no organosilicon inhibitor. The indicated buffer was mixed with a liquid containing 180 parts by weight of water and 100 parts by weight of ethylene glycol.

TABLE III

| Buffer | Amount[1] | pH | | RA[1] | | Wt. Losses, mg./9 in.[2] | | |
|---|---|---|---|---|---|---|---|---|
| | | I | F | I | F | Al | BR | Cu |
| $Na_2CO_3$ | 1.0 | 10.5 | 10.3 | 67 | 8 | 143 | 14 | 19 |
| | | | 10.6 | | 9 | 143 | 14 | 12 |
| Phosphotungstic acid | 1.0 | 10.3 | 9.3 | 17 | 22 | 13 | 5 | 8 |
| NaOH | 0.33 | | 9.4 | | 20 | 17 | 5 | 5 |
| Phosphomolybdic acid | 1.0 | 6.6 | 6.9 | 7 | 11 | 13 | 10 | 13 |
| NaOH | 0.42 | | 6.9 | | 12 | 8 | 4 | 13 |

[1] Per 100 parts by weight of glycol.

These results when compared to Table X demonstrate that better overall corrosion inhibition is obtained in such systems when both an inorganic basic buffer and an organosilicon inhibitor are used.

Example IV

Several compositions of this invention were tested using the 200-hour corrosion test. The indicated organosilicon inhibitor and buffers were added to a solution containing 100 parts by weight of ethylene glycol and 180 parts by weight of water. For comparison purposes, tests on two other compositions are shown: one containing only an organosilicon inhibitor and the other containing only a buffer in the same glycol-water solution. The results are shown in Table IV. The results show that particularly good corrosion protection is often obtained when both a buffer and an organosilicon inhibitor are employed in such systems. The results also show that the relative amount of the buffer, inhibitor, and glycol-water solution may be varied widely and good protection obtained by employing the preferred compositions of this invention.

TABLE IV

| Inhibitor and Buffer | Amount[1] | pH | | RA | | Wt. Losses (mg./9 sq. in.) | | | | |
|---|---|---|---|---|---|---|---|---|---|---|
| | | I | F | I | F | Fe | Al | BR | Cu | S.S. |
| NH$_2$(CH$_2$)$_4$Si(OEt)$_3$ | 1.0 | 10.3 | 9.8 | 13 | 7 | 41 | 15 | 3 | 6 | 6 |
| | | | 9.7 | | 8 | 40 | 8 | 3 | 5 | 6 |
| Na$_2$SiO$_3$.9H$_2$O | 1.0 | 11.6 | 10.8 | 24 | 17 | 3 | 2 | 17 | 21 | 5 |
| | | | 10.8 | | 18 | 7 | 4 | 28 | 21 | 5 |
| NH$_2$(CH$_2$)$_4$Si(OEt)$_3$ | 0.8 | 10.9 | 10.2 | 15 | 10 | 14 | 10 | 3 | 5 | 5.5 |
| Na$_2$SiO$_3$.9H$_2$O | 0.2 | | 10.1 | | 10 | 10 | 21 | 3 | 5 | 5.5 |
| NH$_2$(CH$_2$)$_4$Si(OEt)$_3$ | 0.6 | 11.1 | 10.8 | 17 | 12 | 9 | 3 | 3 | 4 | 5.5 |
| Na$_2$SiO$_3$.9H$_2$O | 0.4 | | 10.7 | | 16 | 5 | 3 | 5 | 2 | 6 |
| NH$_2$(CH$_2$)$_4$Si(OEt)$_3$ | 0.4 | 11.2 | 10.9 | 19 | 18 | 0 | 2 | 2 | 2 | 6 |
| Na$_2$SiO$_3$.9H$_2$O | 0.6 | | 10.8 | | 20 | 2 | 1 | 0 | 1 | 6 |
| NH$_2$(CH$_2$)$_4$Si(OEt)$_3$ | 0.2 | 11.5 | 10.8 | 22 | 19 | 2 | 4 | 3 | 4 | 5.5 |
| Na$_2$SiO$_3$.9H$_2$O | 0.8 | | 10.8 | | 14 | 7 | 12 | 3 | 6 | 5.5 |
| NH$_2$(CH$_2$)$_4$Si(OEt)$_3$ | 0.5 | 11.4 | 10.6 | 37 | 34 | 2 | 1 | 2 | 3 | 6 |
| Na$_2$SiO$_3$ | 0.5 | | 10.4 | | 34 | 2 | 2 | 2 | 3 | 6 |
| NH$_2$(CH$_2$)$_4$Si(OEt)$_3$ | 0.5 | 11.5 | 10.6 | 65 | 61 | 8 | 1 | 4 | 7 | 6 |
| Na$_2$SiO$_3$ | 1.0 | | 10.9 | | 61 | 3 | 2 | 3 | 8 | 6 |

[1] Parts by weight per 100 parts by weight of the glycol.

*Example V*

The 200-hour corrosion test was employed on several test liquids containing 0.5 part by weight (per 100 parts by weight of the glycol) delta-aminobutyltriethoxysilane and 0.6 part by weight (per 100 parts by weight of the glycol) of sodium silicate monohydrate dissolved in a solution containing 100 parts by weight of ethylene glycol and 180 parts by weight of water. The indicated amount of 0.1 N hydrchloric acid were added to the test liquids. An insoluble phase formed (SiO$_2$) when the pH dropped below 10. The results are shown on Table V. The results show the importance of maintaining the pH of such liquids above 7.0 in order to reduce corrosion.

*Example VI*

Solutions were prepared containing delta-aminobutyltriethoxysilane (1.0 part by weight per 100 parts by weight of the glycol), the indicated inorganic compounds and a liquid containing 100 parts by weight of ethylene glycol and 180 parts by weight of water. The resulting single-phase compositions of this invention were tested using the 200-hour corrosion test. For comparison purposes, the same type solution with the inhibitor but without a buffer was also tested. The results shown on Table VI were obtained. The results shows that a wide variety of basic buffers can be used in the compositions of this invention, all of which impart good corrosion inhibiting properties.

TABLE VI

| Buffer | Amount[1] | pH | | RA | | Wt. Loss, mg./9 sq. in. | | | | |
|---|---|---|---|---|---|---|---|---|---|---|
| | | I | F | I | F | Fe | Al | BR | Cu | S.S. |
| Na$_2$SiO$_3$.9H$_2$O | 0.5 | 11.4 | 11.2 | 25 | 17 | 5 | 1 | 2 | 3 | 5.5 |
| | | | 11.2 | | 18 | 6 | 1 | 1 | 3 | 6 |
| Na$_2$MoO$_4$.2H$_2$O | 0.4 | 10.6 | 10.0 | 14 | 3 | 1 | 4 | 2 | 4 | 5.5 |
| | | | 10.1 | | 9 | 4 | 7 | 2 | 4 | 5.5 |
| Li$_2$MoO$_4$ | 0.4 | 10.6 | 9.8 | 20 | 10 | 2 | 0 | 2 | 2 | 6 |
| | | | 9.8 | | 11 | 1 | 0 | 1 | 3 | 5.5 |
| LiBO$_2$ | 1.1 | 8.0 | 7.7 | 80 | 79 | 4 | 33 | 2 | 6 | 6 |
| | | | 7.8 | | 79 | 10 | 22 | 3 | 5 | 5.5 |
| Ca(BO$_2$)$_2$ | 1.0 | 8.3 | 7.7 | 72 | 63 | 12 | 22 | 5 | 9 | 6 |
| | | | 7.8 | | 61 | 12 | 29 | 5 | 9 | 6 |
| Na$_3$PO$_4$ | 0.5 | 11.4 | 10.7 | 36 | 32 | 2 | | 4 | 6 | 5.5 |
| | | | 10.7 | | 32 | 1 | | 2 | 3 | 5.5 |
| NaAsO$_2$ | 1.0 | 9.9 | 9.4 | 36 | 23 | 1 | 13 | 2 | 4 | 6 |
| | | | 8.9 | | 21 | 10 | 59 | 5 | 14 | 6 |
| No buffer | | 10.3 | 9.8 | 13 | 7 | 41 | 15 | 3 | 6 | 6 |
| | | | 9.7 | | 8 | 40 | 8 | 3 | 5 | 6 |
| No buffer or inhibitor | | 6.9 | 4.9 | 0 | acid | 1,737 | 40 | 196 | 186 | 4.5 |

[1] Parts by weight per 100 parts by weight of the glycol.

TABLE V

| Acid[1] | pH | | RA | | Wt. Losses, mg./9 sq. in. | | | | |
|---|---|---|---|---|---|---|---|---|---|
| | I | F | I | F | Fe | Al | Cu | BR | S.S. |
| None | 11.2 | 10.9 | 19 | 19 | 1 | 2 | 1 | 2 | 6 |
| 6.9 | 10.4 | 10.4 | 12 | 9 | 16 | 13 | 3 | 5 | 5.5 |
| 12.6 | 9.7 | 8.4 | 5 | 2 | 88 | 27 | 6 | 15 | 5 |
| 14.9 | 8.1 | 6.1 | 2 | 1 | 373 | 202 | 82 | 160 | 4 |
| 16.5 | 7.7 | 5.8 | 2 | 1 | 613 | | 76 | 180 | 4 |
| 18.0 | 6.3 | 6.1 | 1 | 1 | 496 | 409 | 206 | 317 | 4.5 |
| 18.3 | 6.0 | 5.5 | 1 | 0 | 1,053 | 537 | 167 | 226 | 4 |
| 18.5 | 5.9 | 5.8 | 1 | 0 | 871 | 487 | 217 | 360 | 4 |

[1] Ml. acid per 100 ml. of test liquid.

*Example VII*

The 200-hour corrosion test was conducted on three compositions of this invention containing:

|  | Parts by weight |
|---|---|
| The indicated copolymer | 1 |
| Ca(BO$_2$)$_2$ [formed by mixing Ca(OH)$_2$ with an excess of H$_3$BO$_3$] | 1.0 |
| Ethylene glycol | 95.88 |
| Water | 1 |

The results appear in Table VII.

Table VII

| Copolymer Composed of the Indicated Groups | pH | | RA | | Wt. Losses (mg./9 in.²) | | | | |
|---|---|---|---|---|---|---|---|---|---|
| | I | F | I | F | Fe | Al | BR | Cu | S.S. |
| MeSiO₁.₅ and NH₂(CH₂)₂SiO₁.₅¹ | 8.3 | ----- | 85 | ----- | 7<br>14 | 2<br>5 | 6<br>4 | 6<br>4 | 5.5<br>5.5 |
| C₂H₅SiO₁.₅ and NH₂(CH₂)₂SiO₁.₅¹ | 8.6 | 7.7<br>7.7 | 80 | 54<br>52 | 9<br>9 | 2<br>13 | 4<br>4 | 7<br>8 | 5.5<br>5 |
| C₂H₃SiO₁.₅ and NH₂(CH₂)₃SiO₁.₅¹ | 8.3 | 8.4<br>8.4 | 78 | 59<br>63 | 6<br>4 | 2<br>2 | 4<br>4 | 5<br>4 | 5.5<br>5.5 |
| CH₃SiO₁.₅ and NH₂(CH₂)₃SiO₁.₅² | 8.1 | 7.6<br>7.6 | 69 | 50<br>50 | 23<br>12 | ----- | 6<br>5 | 18<br>19 | 5<br>5 |

¹ Equal number of these groups in the copolymer.
² Twice as many CH₃SiO₁.₅ groups as NH₂(CH₂)₃SiO₁.₅ groups in the copolymer.

*Example VIII*

Three compositions of this invention were tested using the 200-hour corrosion test. The compositions contained one part by weight of the indicated copolymer and 1.0 part by weight of calcium borate (formed by mixing calcium hydroxide with an excess of boric acid) per 100 parts by weight of the ethylene glycol. The copolymer and calcium borate were dissolved in a liquid containing 100 parts by weight of ethylene glycol and 180 parts by weight of water. The results obtained are shown on Table VIII. The results show that copolymeric inhibitors are useful in the compositions of this invention to retard corrosion.

TABLE VIII

| Inhibitor ¹ | pH | | RA | | Wt. Losses, mg./9 in.² | | | | |
|---|---|---|---|---|---|---|---|---|---|
| | I | F | I | F | Fe | Al | BR | Cu | S.S. |
| [NH₂C₃H₆SiO₁.₅] and [C₆H₅SiO₁.₅] (four runs) | 8.2<br>-----<br>8.1<br>----- | 7.5<br>7.5<br>7.8<br>7.8 | 73<br>-----<br>69<br>----- | 64<br>53<br>47<br>50 | 16<br>9<br>31<br>20 | 1<br>16<br>42<br>12 | 5<br>7<br>6<br>6 | 13<br>12<br>16<br>13 | 5<br>5<br>5<br>5 |
| [NH₂C₄H₈SiO₁.₅] and [C₆H₅SiO₁.₅] | 8.1<br>----- | 7.6<br>7.7 | 73 | 62<br>57 | 15<br>18 | 1<br>1 | 6<br>4 | 6<br>6 | 5.5<br>5.5 |
| [NH₂C₃H₆SiO₁.₅] and [C₅H₁₁SiO₁.₅] | 8.1<br>----- | 8.0<br>8.0 | 69 | 43<br>55 | 21<br>20 | 2<br>4 | 5<br>3 | 5<br>4 | 6<br>5.5 |

¹ Copolymers composed of the equal numbers of the indicated groups.

*Example IX*

The 200-hour corrosion test was run using equal molar mixture of gamma-aminopropyltriethoxysilane and phenyltriethoxysilane, as monomers, in lieu of the corresponding copolymer to determine whether the mixture of monomers allowed to react in situ would be as effective as the preformed copolymer. One part by weight of the mixture of monomers per 100 parts by weight of the glycol was used. The solution used was otherwise the same as the solutions under Example VIII. The results are summarized below:

| pH | | RA | | Wt. Losses, mg./9 in.² | | | | |
|---|---|---|---|---|---|---|---|---|
| I | F | I | F | Fe | Al | BR | Cu | S.S. |
| 8.6<br>----- | 8.2<br>8.1 | 73 | 60<br>57 | 4<br>4 | 1<br>2 | 3<br>5 | 3<br>5 | 5.5<br>5.5 |

The data when compared to Example VIII show that the use of both copolymers and the corresponding monomers provided good protection for the metals tested.

*Example X*

The 200-hour corrosion test was run on two compositions of this invention that contain two basic buffers. The indicated inhibitors and buffers were dissolved in a solution containing 100 parts by weight of ethylene glycol and 180 parts by weight of water. For reference purposes, the same test was run on compositions containing an organosilicon inhibitor and one buffer, one buffer and no organosilicon inhibitor, and two buffers and no organosili-

TABLE IX

| Component | Amount ¹ | pH | | RA | | Wt. Losses, mg./9 sq. in.² | | | | |
|---|---|---|---|---|---|---|---|---|---|---|
| | | I | F | I | F | Fe | Al | BR | Cu | S.S. |
| Na₃PO₄<br>Na₂SiO₃<br>NH₂(CH₂)₄Si(OEt)₃ | 0.5<br>0.5<br>0.5 | 11.3<br>-----<br>----- | 10.6<br>10.7<br>----- | 61<br>-----<br>----- | 51<br>45<br>----- | 2<br>3<br>---- | 1<br>1<br>---- | 2<br>4<br>---- | 4<br>9<br>---- | 6<br>6<br>---- |
| Na₃PO₄<br>Na₂SiO₃<br>NH₂(CH₂)₄Si(OEt)₃ | 0.5<br>1.0<br>0.5 | 11.5<br>-----<br>----- | 10.7<br>10.8<br>----- | 91<br>-----<br>----- | 80<br>67<br>----- | 3<br>3<br>---- | 0<br>1<br>---- | 2<br>3<br>---- | 9<br>15<br>---- | 6<br>6<br>---- |
| NH₂(CH₂)₄Si(OEt)₃<br>Na₂SiO₃ | 0.4<br>0.6 | 11.2<br>----- | 10.9<br>10.8 | 19<br>----- | 18<br>20 | 0<br>2 | 2<br>1 | 2<br>0 | 2<br>1 | 6<br>6 |
| Na₃PO₄ | 0.5 | 11.1<br>----- | 10.4<br>10.4 | 24<br>----- | 22<br>23 | 1<br>3 | 77<br>80 | 1<br>3 | 9<br>7 | 5.5<br>6 |
| Na₃PO₄<br>Na₂SiO₃ | 0.5<br>0.5 | 11.4<br>----- | 10.5<br>10.5 | 54<br>----- | 35<br>29 | 6<br>9 | 1<br>1 | 18<br>50 | 22<br>27 | 6<br>6 |

¹ Parts by weight per 100 parts by weight of the glycol.

con inhibitor dissolved in the same type glycol-water solution. The results obtained are shown on Table IX. The results show that compositions of this invention containing two buffers are useful in retarding corrosion.

*Example XI*

Several solutions containing various organosilicon inhibitor-buffer combinations were tested using the 200-hour corrosion test. The inhibitors and buffers were dissolved in a solution containing 100 parts by weight of ethylene glycol and 180 parts by weight of water. The results obtained are shown on Table X.

position of this invention (Formula C diluted with water) in one side of the split cooling system and in the other side a commercially available two-phase antifreeze (Formula D). The results appear in Table XII. The results show that the aluminum losses were lower with Formula C. Good protection was also afforded iron, copper and solder by Formula C in this test. The solution containing Formula C maintained a pH of over 7 and good reserve alkalinity throughout the test and the decomposition of the glycol in this solution was negligible.

TABLE X

| Inhibitor and Buffer | Amount [1] | pH I | pH F | RA I | RA F | Wt. Losses, mg./9 in.$^2$ Fe | Al | BR | Cu | S.S. |
|---|---|---|---|---|---|---|---|---|---|---|
| Phosphotungstic acid | 1.0 | 10.2 | 10.0 | 32 | 24 | 5 | 3 | 5 | | 6 |
| $NH_2C_4H_8Si(OC_2H_5)_3$ | 1.0 | | 10.1 | | 23 | 5 | 2 | 5 | | 5.5 |
| NaOH | 0.33 | | | | | | | | | |
| Phosphomolybdic acid | 1.0 | 9.9 | 9.9 | 15 | 8 | 3 | 1 | 5 | | 5.5 |
| $NH_2C_4H_8Si(OC_2H_5)_3$ | 1.0 | | 9.8 | | 8 | 2 | 2 | 3 | 7 | 5.5 |
| NaOH | 0.42 | | | | | | | | | |
| $Na_2CO_3$ | 1.0 | 10.5 | 10.7 | 94 | 88 | 2 | | 2 | 6 | 5.5 |
| $[NH_2C_4H_8SiCH_3O]_4$ | 1.0 | | 10.7 | | 82 | 4 | | 2 | 4 | 5.5 |
| Phosphomolybdic acid | 1.0 | 10.2 | 10.4 | 28 | 18 | 1 | 5 | 1 | 4 | 5.5 |
| NaOH | 0.42 | | 10.3 | | 17 | 3 | 4 | 4 | 17 | 5.5 |
| $[NH_2C_4H_8SiCH_3O]_4$ | 1.0 | | | | | | | | | |
| m-$NH_2CH_2C_6H_4Si(OC_2H_5)_3$ | 1.0 | 8.2 | 7.9 | 71 | 67 | 5 | 1 | 21 | 1 | 5 |
| $Ca(BO_2)_2$ | 1.0 | | 7.9 | | 66 | 6 | 0 | 2 | 1 | 5.5 |
| $HN_2C_2H_4CH(Me)CH_2Si(OC_2H_5)_2$ | 1.0 | 8.6 | 7.8 | 81 | 56 | 11 | 3 | 3 | 4 | 5.5 |
| $NH_2(CH_2)_5$ | | | 7.9 | | 55 | 11 | 6 | 3 | 2 | 5 |
| $Ca(BO_2)_2$ | 1.0 | | | | | | | | | |
| p-$NH_2CH_2C_6H_4Si(OC_2H_5)_3$ | 1.0 | 8.2 | 8.0 | 68 | 64 | 12 | 1 | 3 | 3 | 5 |
| $Ca(BO_2)_2$ | 1.0 | | 8.0 | | 62 | 4 | 1 | 2 | 2 | 5.5 |

[1] Parts by weight per 100 parts by weight of the glycol.

The results demonstrate the usefulness of buffered, inhibited glycol-water compositions, especially to protect iron.

*Example XII*

Pre-rusted engine tests were performed on a composition of this invention (Formula A) and a commercially available two-phase antifreeze (Formula D). Both compositions were diluted with an equal volume of water. The results are shown on Table XI. The results show that the aluminum losses were lower with Formula A. Good protection was also afforded iron, copper and solder by Formula A in this test. The solution containing Formula A maintained a pH of over 7 and good reserve alkalinity throughout the test, and the decomposition of the glycol in this solution was negligible.

TABLE XI.—CORROSION

| Mileage | Weight Losses, mg./4½ in.$^2$ | |
|---|---|---|
| | Left Side (Formula A) Aluminum | Right Side (Formula D) Aluminum |
| 5,000 | 6 | 28 |
| 10,000 | 33 | 120 |
| 15,000 | 67 | 129 |
| 15,000 [1] | 16 | 80 |
| 20,000 | 136 | 256 |
| 25,000 | 248 | 315 |

[1] Specimens were undisturbed until 15,000 miles. Others were cleaned and weighed every 5,000 miles.

*Example XIII*

Pre-rusted engine tests were performed using a com-

TABLE XII.—CORROSION

| Miles | Formula D,[1] Wt. Losses, mg./4.5 sq. in., Aluminum | Formula C,[1] Wt. Losses, mg./4.5 sq. in., Aluminum |
|---|---|---|
| 5,000 | 15 | 1 |
| 10,000 | 76 | 1 |
| 15,000 | 129 | 3 |
| 20,000 | 188 | 51 |
| 25,000 | 250 | 146 |
| 15,000 [2] | 78 | 2 |
| 20,000 [2] | 133 | 50 |
| 25,000 [2] | 196 | 140 |

[1] Diluted with about an equal volume of water.
[2] Specimens first weighed at 15,000 miles and thereafter cumulatively at 5,000-mile intervals.

Non-aerated foaming losses were 650 ml. for Formula D and 305 ml. for Formula C.

*Example XIV*

A clean engine test was run using Formula F diluted with an equal volume of water. The aluminum losses are shown on Table XIII. Good protection was also afforded iron, copper and solder in this test by Formula F.

TABLE XIII.—WT. LOSS OF ALUMINUM

Test miles:                      Mg./4.5 in.$^2$
   5,000 ------------------------------------ 1
  10,000 ------------------------------------ 2
  15,000 ------------------------------------ 15
  20,000 ------------------------------------ 36

*Example XV*

Several compositions of this invention were stored for over six months, both at room temperature and at 50° C. These compositions contained the indicated buffer and inhibitor dissolved in 99 parts by weight ethylene glycol containing 1 part by weight water. At the end of the storage period the compositions were inspected to determine if any change in color had occurred and if any precipitates had formed. The results on Table XIV show that the compositions of this invention possess excellent shelf life.

TABLE XIV

| Inhibitor and Buffer | Amount[1] | Room Temp. and 50° C. | Precipitate |
|---|---|---|---|
| $NH_2(CH_2)_3Si(OEt)_3$ $Na_2SiO_3$ | 0.5 0.5 | Clear, colorless | None. |
| $NH_2(CH_2)_3Si(OEt)_3$ $Na_2SiO_3$ | 0.5 1.0 | ----do---- | Do. |
| $NH_2(CH_2)_3Si(OEt)_3$ $Na_2SiO_3$ | 0.5 1.5 | ----do---- | Do. |
| $NH_2(CH_2)_3Si(OEt)_3$ $Na_2SiO_3$ | 0.5 2.0 | ----do---- | Do. |
| $NH_2(CH_2)_3Si(OEt)_3$ $Ca(BO_2)_2$ | 1.0 1.0 | Clear [2] | Do. |

[1] Parts by weight per 100 parts by weight of the glycol.
[2] Colorless at room temperature and slightly yellow at 50° C.

Example XVI

The 200-hour corrosion test was performed employing two compositions of this invention containing organosilicon copolymers containing a group represented by Formula 3 where Z' is an $HOR^3$— group. These copolymers were formed in situ by adding the indicated silanes and oxirane compounds to a solution containing 100 parts by weight of ethylene glycol and 180 parts by weight of water. One part by weight of sodium borate (per 100 parts by weight of the glycol) was dissolved in the aqueous glycol solution. The results obtained are shown on Table XV. The results demonstrate that compositions containing these copolymers inhibit corrosion, particularly corrosion of iron.

TABLE XV

| Starting Materials Used in Forming Copolymer—Compound | Amount[1] | pH | | RA | | Weight Loss, mg./9 sq. in. | | | |
|---|---|---|---|---|---|---|---|---|---|
| | | I | F | I | F | Fe | BR | Cu | S.S. |
| $NH_2(CH_2)_3Si(OC_2H_5)_3$ $CH_3Si(OC_2H_5)_3$ $C_6H_{12}O_2$ [2] | 0.63 0.51 0.60 | 8.0 ---- ---- | 7.5 7.4 ---- | 74 ---- ---- | 54 55 ---- | 13 15 ---- | 6 6 ---- | 16 15 ---- | 5 5.5 ---- |
| $NH_2(CH_2)_3Si(OC_2H_5)_3$ $CH_3Si(OC_2H_5)_3$ $C_{10}H_7O_2$ [3] | 0.63 0.51 0.09 | 8.0 ---- ---- | 7.4 7.4 ---- | 74 ---- ---- | 52 55 ---- | 12 12 ---- | 10 6 ---- | 42 27 ---- | 5 5.5 ---- |

[1] Parts by weight per 100 parts by weight of the glycol.
[2] 1,2-epoxy-3-isopropoxypropane.
[3] Dipentene dioxide.

Example XVII

One of the compositions of this invention (Formula F) was tested in a rubber immersion test and compared to a known two-phase antifreeze (Formula D). The procedure followed is outlined in "Rubber Immersion Test Procedures for Engine Antifreezes," ASTM D-15, Subcommittee V, Fourth Collaborative Test Program. Rubber radiator hoses from three makes of automobiles (makes I, II and III) were split so that only the inner ply that is in contact with the coolant during normal use was tested. After immersion for 72 hours in the liquid composition being tested, the change in hardness, volume and weight of the hoses were measured. The results are shown on Table XVI. In the Hardness test, deviations above and below zero are equally undesirable. The results show that Formula F compared favorably with Formula D.

TABLE XVI

| Radiator Hose From Automobile Make— | Composition Tested | Changes in: | | |
|---|---|---|---|---|
| | | Hardness (a) | Weight, percent | Volume, percent |
| I | Formula F Formula D | +3 −7 | +0.2 +1.1 | +0.3 +1.3 |
| II | Formula F Formula D | 0 −5 | +2.3 +2.8 | +3.1 +3.9 |
| III | Formula F Formula D | +3 0 | +0.6 +1.5 | +0.7 +1.8 |

What is claimed is:

1. A single phase antifreeze composition comprising (1) an alcohol selected from the group consisting of methanol, ethanol, propanol, ethylene glycol, diethylene glycol, triethylene glycol, propylene glycol and glycerol; (2) from 0.1 part to 10 parts by weight of a salt derived from (a) a base selected from the group consisting of the alkali metal hydroxides, the alkali earth metal hydroxides and ammonium hydroxide and (b) an acid selected from the group consisting of boric, molybdic, phosphotungstic, phosphomolybdic, phosphoric, carbonic, tungstic, and arsenious acids; and (3) from 0.0001 part to 10 parts by weight of an inhibitor selected from the group consisting of:

(a) hydrocarbonoxysilanes represented by the formula:

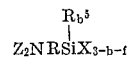

wherein Z is a member selected from the group consisting of the hydrogen atom, monovalent hydrocarbon groups, substituted monovalent hydrocarbon groups containing a substituent selected from the group consisting of the hydroxyl, amino, amido, ester, hydrocarbonoxy and cyano groups and divalent groups that are derived from oxirane compounds by the opening of the oxirane ring and that link the nitrogen atom to the silicon atom through a carbon to carbon to nitrogen bond; R is a divalent hydrocarbon group containing at least three carbon atoms; the $Z_2N$— group is attached to at least the third carbon removed from the silicon atom; $R^5$ is a member selected from the group consisting of the monovalent hydrocarbon groups and the $NH_2C_nH_{2n}$— groups were $n$ has a value of at least 3; X is a member selected from the group consisting of the alkoxy and aroxy groups; $b$ has a value from 0 to 2; $f$ has a value from 0 to 2 and represents the number of said divalent groups represented by Z; and $(3-b-f)$ has a value from 1 to 3;

(b) siloxanes consisting essentially of siloxane groups represented by the formula:

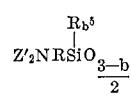

wherein Z' is a member selected from the group consisting of the hydrogen atom, monovalent hydrocarbon groups, substituted monovalent hydrocarbon groups containing substituents selected from the group consisting of hydroxyl, amino, amido, ester, cyano and hydrocarbonoxy groups and R, $R^5$ and $b$ have the above-defined meanings; and (c) siloxanes consisting essentially of both the above-defined siloxane groups and siloxane groups having the formula:

$$R_e^6 SiO_{\frac{4-e}{2}}$$

wherein $R^6$ is a monovalent hydrocarbon group and $e$ has a value from 1 to 3, said parts by weight being based on 100 parts by weight of said alcohol.

2. A single phase antifreeze composition comprising (1) ethylene glycol, (2) from 0.1 part to 10 parts by weight of a salt derived from (a) a base selected from the group consisting of the alkali metal hydroxides, the alkali earth metal hydroxides and ammonium hydroxide and (b) a weak acid selected from the group consisting of boric, molybdic, phosphotungstic, phosphomolybdic, phosphoric, carbonic, tungstic, and arsenious acids; and (3) from 0.0001 part to 10 parts by weight of a hydrocarbonoxysilane represented by the formula:

$$Z_2 N R \overset{R_b^5}{\underset{|}{Si}} X_{3-b-f}$$

wherein Z is a member selected from the group consisting of the hydrogen atom, monovalent hydrocarbon groups, substituted monovalent hydrocarbon groups containing a substituent selected from the group consisting of the hydroxyl, amino, amido, ester, hydrocarbonoxy and cyano group and divalent groups that are derived from oxirane compounds by the opening of the oxirane ring and that link the nitrogen atom to the silicon atom through a carbon-to-carbon-to-nitrogen bond; R is a divalent hydrocarbon group containing at least three carbon atoms; the $Z_2N-$ group is attached to at least the third carbon removed from the silicon atom; $R^5$ is a member selected from the group consisting of the monovalent hydrocarbon groups and the $NH_2C_nH_{2n}-$ groups where $n$ has a value of at least 3; X is a member selected from the group consisting of the alkoxy and aroxy groups; $b$ has a value from 0 to 2; $f$ has a value from 0 to 2 and represents the number of said divalent groups represented by Z; and $(3-b-f)$ has a value from 1 to 3, said parts by weight being based on 100 parts by weight of the ethylene glycol.

3. A single phase antifreeze composition comprising (1) ethylene glycol; (2) from 0.1 part to 10 parts by weight of a salt derived from (a) a base selected from the group consisting of the alkali metal hydroxides, the alkali earth metal hydroxides and ammonium hydroxide and (b) a weak acid selected from the group consisting of boric, molybdic, phosphotungstic, phosphomolybdic, phosphoric, carbonic, tungstic, and arsenious acids; and (3) from 0.0001 part to 10 parts by weight of a siloxane consisting essentially of groups represented by the formula:

$$Z'_2 N R \overset{R_b^5}{\underset{|}{Si}} O_{\frac{3-b}{2}}$$

wherein Z' is a member selected from the group consisting of the hydrogen atom, monovalent hydrocarbon groups, substituted monovalent hydrocarbon groups containing substituents selected from the group consisting of the hydroxyl, amino, amido, ester, cyano and hydrocarbonoxy groups; R is a divalent hydrocarbon group containing at least three successive carbon atoms; the $Z_2N-$ group is attached to at least the third carbon removed from the silicon atom; $R^5$ is a member selected from the group consisting of the monovalent hydrocarbon groups and the $NH_2(C_2H_{2n})-$ groups where $n$ has a value of at least 3; and $b$ has a value from 0 to 2, said parts by weight being based on 100 parts by weight of said ethylene glycol.

4. A single phase antifreeze composition comprising ethylene glycol, from 0.1 part to 10 parts by weight of calcium borate and from 0.0001 part to 10 parts by weight of gamma-aminopropyltriethoxysilane, said parts by weight being based on 100 parts by weight of the glycol.

5. A single phase antifreeze composition comprising ethylene glycol, from 0.1 part to 10 parts by weight of calcium borate and from 0.0001 part to 10 parts by weight of delta-aminobutyltriethoxysilane, said parts by weight being based on 100 parts by weight of the glycol.

6. A single phase antifreeze composition comprising ethylene glycol, from 0.1 part to 10 parts by weight of calcium borate and from 0.0001 part to 10 parts by weight of a siloxane consisting essentially of gamma-aminopropylsiloxy groups, said parts by weight being based on 100 parts by weight of the glycol.

7. A single phase antifreeze composition comprising ethylene glycol, from 0.0001 part to 10 parts by weight of gamma-aminopropyltriethoxysilane and from 0.1 part to 10 parts by weight of magnesium borate, said parts by weight being based on 100 parts by weight of the glycol.

8. A single phase antifreeze composition comprising ethylene glycol, from 0.0001 part to 10 parts by weight of gamma-aminopropyltriethoxysilane and from 0.1 part to 10 parts by weight of sodium borate, said parts by weight being based on 100 parts by weight of the glycol.

9. A single phase antifreeze composition comprising ethylene glycol, from 0.0001 part to 10 parts by weight of gamma-aminopropyltriethoxysilane, and from 0.1 part to 10 parts by weight of potassium borate, said parts by weight being based on 100 parts by weight of the glycol.

10. A single phase antifreeze composition comprising water, ethylene glycol, from 0.1 part to 10 parts by weight of calcium borate and from 0.0001 part to 10 parts by weight of a siloxane consisting essentially of gamma-aminopropylsiloxy groups, said parts by weight being based on 100 parts by weight of the glycol.

11. A single phase antifreeze composition comprising water, ethylene glycol, from 0.1 part to 10 parts by weight of sodium borate and from 0.0001 part to 10 parts by weight of a siloxane consisting essentially of gamma-aminopropylsiloxy groups, said parts by weight being based on 100 parts by weight of the glycol.

12. A single phase antifreeze composition comprising water, ethylene glycol, from 0.1 part to 10 parts by weight of calcium borate and from 0.0001 part to 10 parts by weight of a siloxane consisting essentially of delta-aminobutylsiloxy groups, said parts by weight being based on 100 parts by weight of the glycol.

References Cited in the file of this patent

UNITED STATES PATENTS 2,832,754   Jex ———————————— Apr. 29, 1958